F. W. GOEDEKE.
INSECT TRAP FOR CASTERS.
APPLICATION FILED NOV. 4, 1914.

1,242,680.

Patented Oct. 9, 1917.

WITNESSES

Frederick W. Goedeke, INVENTOR

BY

ATTORNEY

UNITED STATES PATENT OFFICE.

FREDERICK W. GOEDEKE, OF EVANSVILLE, INDIANA.

INSECT-TRAP FOR CASTERS.

1,242,680.    Specification of Letters Patent.    Patented Oct. 9, 1917.

Application filed November 4, 1914. Serial No. 870,283.

*To all whom it may concern:*

Be it known that I, FREDERICK W. GOEDEKE, a citizen of the United States, residing at Evansville, in the county of Vanderberg and State of Indiana, have invented a new and useful Insect-Trap for Casters, of which the following is a specification.

The invention relates to improvements in insect traps for casters.

The object of the present invention is to improve the construction of insect traps for casters and to provide a cheap, practical, and inexpensive trap designed particularly for use on kitchen cabinet casters to prevent ants from crawling up the legs and obtaining access to the contents of such articles of furniture, and adapted to be readily applied without change to all standard casters.

With these and other objects in view the invention consists in the construction and novel combination of parts hereinafter fully described, illustrated in the accompanying drawing, and pointed out in the claim appended hereto, it being understood that various changes in the form, proportion, size and minor details of construction, within the scope of the claim, may be resorted to without departing from the spirit or sacrificing any of the advantages of the invention.

In the drawing:—

Like numerals of reference designate corresponding parts in both the figures of the drawing.

Figure 1:
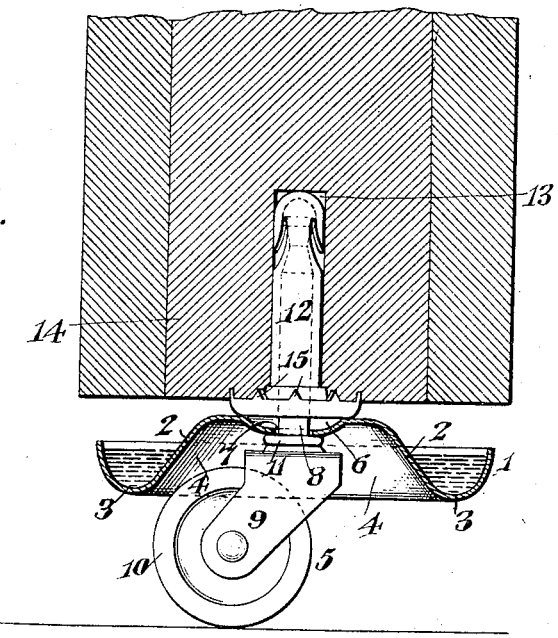
Figure 1 is a vertical sectional view of an ant trap constructed in accordance with this invention and shown applied to a caster.
Figure 2:
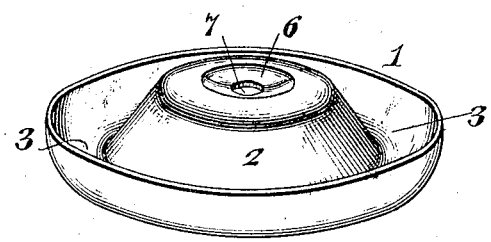
Fig. 2 is a perspective view of the ant trap detached.

In the accompanying drawing, in which is illustrated the preferred embodiment of the invention, 1 designates an ant trap designed to be stamped or otherwise formed of sheet metal or other suitable material and consisting of a cup or pan having a raised central dome-shaped portion 2 and provided with an annular trough 3 surrounding the central dome-shaped portion and adapted to contain oil or other liquid for destroying ants and other insects. The annular trough, which is approximately U-shaped in cross section, is composed of inner and outer walls and a connecting bottom portion, the inner wall being integral with the central dome-shaped portion and constituting a part thereof, as clearly illustrated in the drawing. The central dome-shaped portion, which forms a lower concavity or recess 4 to receive the lower portion of a caster 5, is provided at the top with a depressed center 6 having a central opening 7 through which the stem 8 of the caster 5 extends. The central dome-shaped portion of the trap extends over the bracket 9 of the caster and over a portion of the roller 10 thereof, and the said trap rests upon a shoulder 11 at the lower end of the stem 8.

The stem 8 extends into a metal socket 12, which is arranged within an annular bead having a recess 13 of a leg 14. The metal socket is provided with spurs or projections 15 for engaging the lower end of the leg, and the trap, by being arranged on the stem between the bracket 9 and the bottom of the metal socket 12, is adapted to be readily applied to various makes of standard casters. The center of the dome shaped portion 2 of the trap is depressed at its center, as at 6, causing the inner surface of the depressed portion to engage the shoulder 11 on the stem 8 of the caster, and the upper or outer surface of the dome to engage the inner surface of the spur bead 15. This connection of the trap between the shoulder 11 and bead 15 causes the trap to be held rigidly in a horizontal plane, and overcomes any possibility of the trap wobbling or tilting whereby the contents of the trough would be spilled or discharged over the upper edge of the trough. It is possible with a trough constructed in this manner to apply it to practically all of the standard casters, as the depressed portion 6 and the outer portion of the dome will completely fill the space between the spur bead, which is connected to the socket 12 for maintaining the socket in position, and the usual shoulder 11 formed on the stem 8. The invention consists of a single piece of metal bent into a shape to fit a caster and to maintain the outer edge of the trough a sufficient distance beneath the leg of the furniture, no matter of what size, so that the ants or insects can not pass from the outer edge of the trough onto the furniture. The liquid holding trough, by being located below the projecting top of the central dome-shaped portion, is spaced from the lower end of the leg 14 so that ants crawling up the caster and around the outer wall of the trough can not reach the leg 14, but will enter the trough and be destroyed by the liquid contents thereof. In this manner an effective trap for preventing ants and other insects from crawling up the legs of kitchen cabinets and various other articles of furniture is provided. Also, by the particular arrangement of the insect trap with relation to the upper and lower portions of the caster, the trap is relieved of the pressure incident to the weight of the kitchen cabinet or other article of furniture and is not injured by the same when applied to a caster thereof.

What is claimed is:

In combination with a socket provided with a spur bead at its lower terminal adapted to engage a furniture leg, a caster consisting of a roller, bracket and stem, the latter being fitted in the socket and having a shoulder formed thereon at the base of the stem above the bracket, and an insect trap formed of a single piece of metal adapted to be mounted entirely below the end of said leg out of the way and consisting of a central downwardly diverging dome-shaped portion arranged to extend over and partially house the bracket and roller of the caster but spaced therefrom, and an outwardly bent liquid-receiving trough surrounding the central dome-shaped portion at the lower part thereof and having its outer wall terminating below the horizontal plane of the top of said dome-shaped portion, said dome-shaped portion being depressed at the center thereof and having an opening through said depressed portion for the passage of the stem of the caster, the said shoulder on the stem engaging the under surface of said depressed portion and closing the said opening, and said spur bead engaging the upper surface of the dome-shaped portion beyond and around said depressed portion for maintaining the trap rigidly in a horizontal plane in spaced relation to the furniture leg, the trap being removable as a unit with the caster and socket and carried by said parts.

In testimony, that I claim the foregoing as my own, I have hereto affixed my signature in the presence of two witnesses.

FREDERICK W. GOEDEKE.

Witnesses:
FRANK E. GORE,
MARGUERITE BOERKE.